June 5, 1956  E. C. BROWN ET AL  2,748,509
SIX WHEEL DRIVE AND STEER ROAD MACHINE
Filed May 27, 1950  6 Sheets-Sheet 1
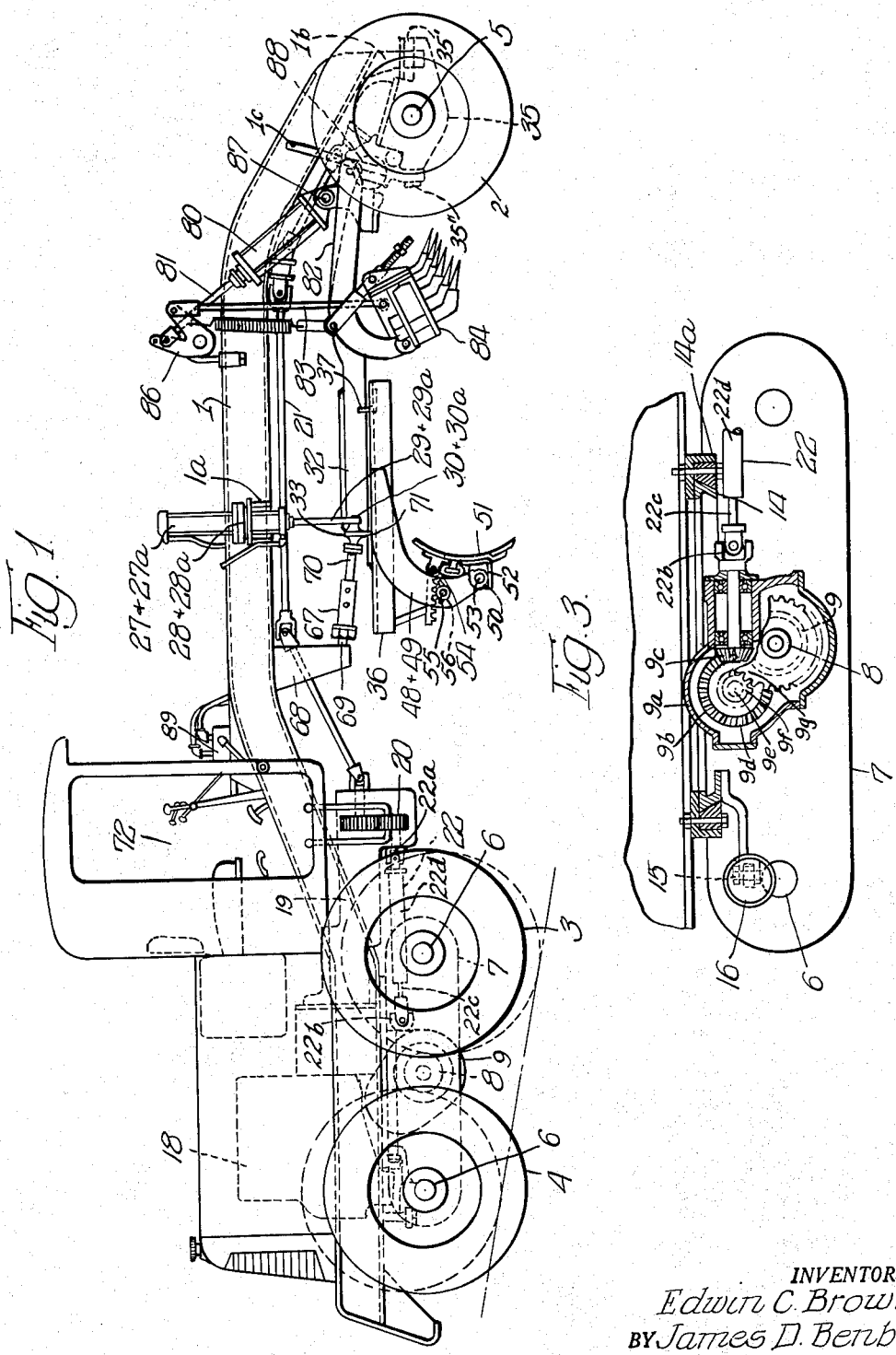
INVENTORS.
Edwin C. Brown,
BY James D. Benbow,
James D Benbow
Atty June 5, 1956 E. C. BROWN ET AL 2,748,509
SIX WHEEL DRIVE AND STEER ROAD MACHINE
Filed May 27, 1950 6 Sheets-Sheet 2
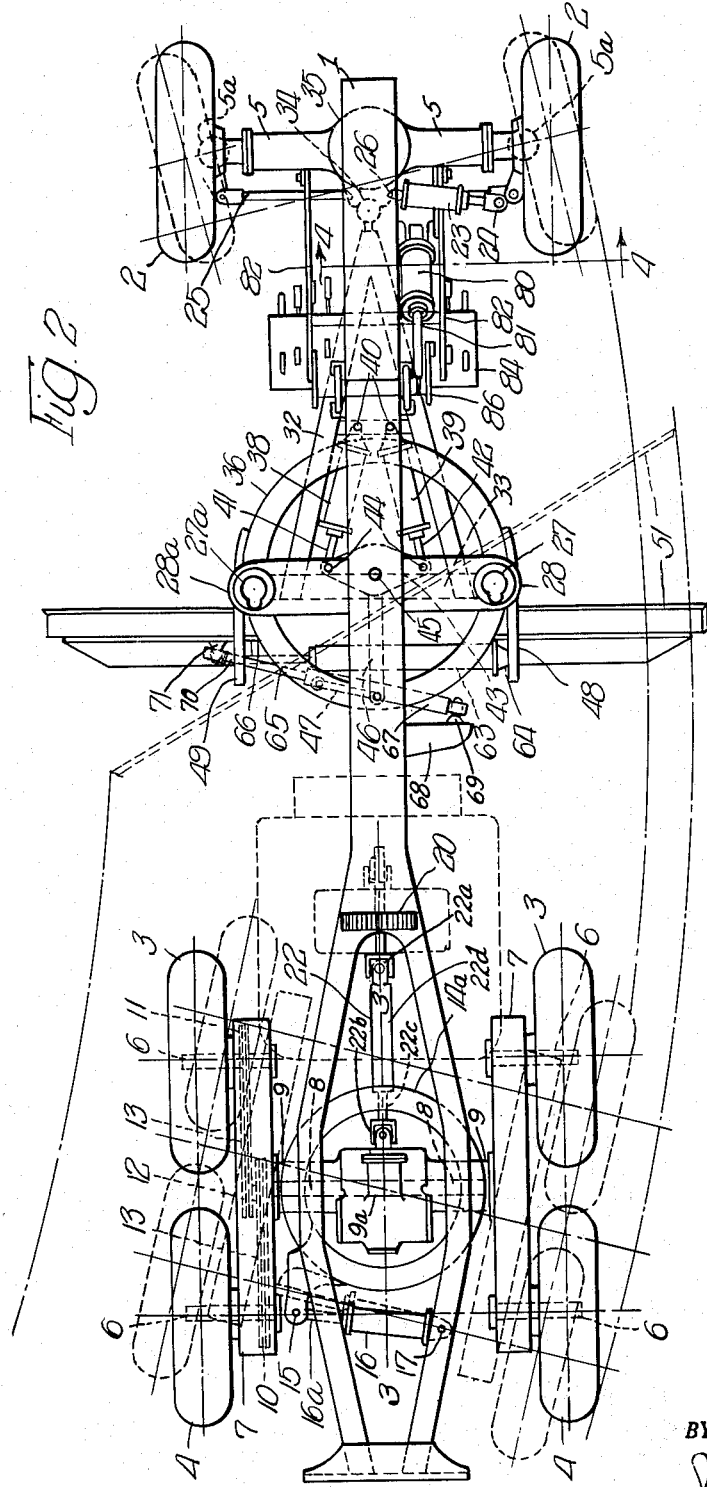
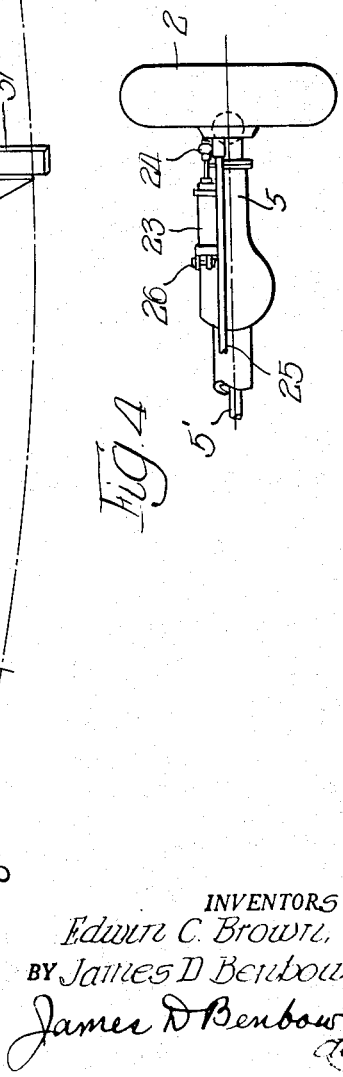
INVENTORS
Edwin C. Brown,
BY James D. Benbow.

June 5, 1956  E. C. BROWN ET AL  2,748,509
SIX WHEEL DRIVE AND STEER ROAD MACHINE
Filed May 27, 1950  6 Sheets-Sheet 3
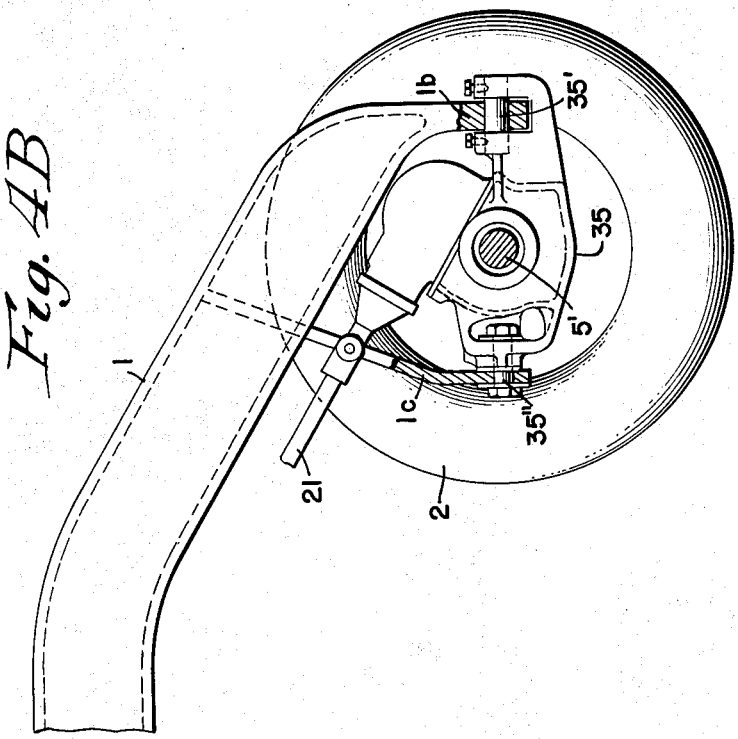
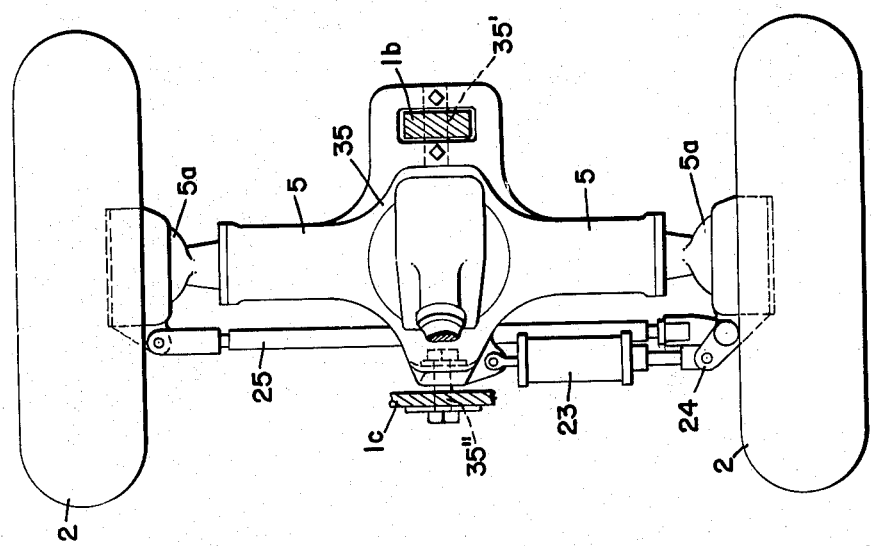
INVENTOR.
*Edwin C. Brown*
BY *James D. Benbow*
*Brown, Jackson, Boettcher & Dienner*
*Attorneys.*

June 5, 1956     E. C. BROWN ET AL     2,748,509
SIX WHEEL DRIVE AND STEER ROAD MACHINE
Filed May 27, 1950     6 Sheets-Sheet 4
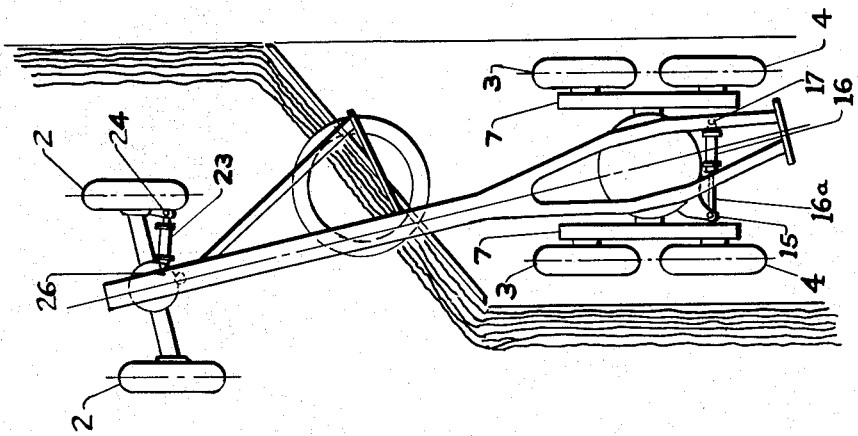
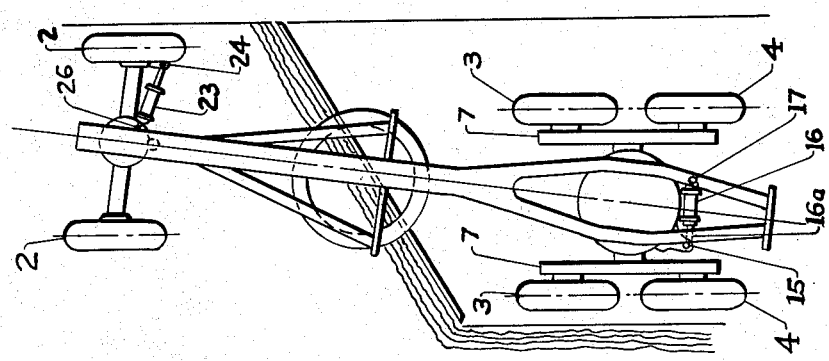
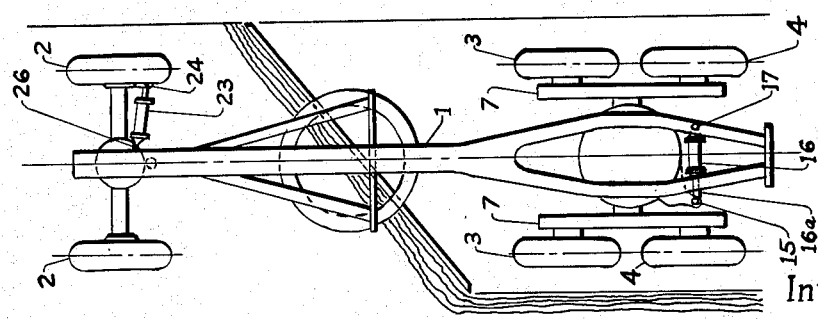
Inventors
EDWIN C. BROWN
JAMES D. BENBOW
By James D Benbow
Att'y.

Inventors
EDWIN C. BROWN
JAMES D. BENBOW
By James D. Benbow
Att'y.

June 5, 1956  E. C. BROWN ET AL  2,748,509
SIX WHEEL DRIVE AND STEER ROAD MACHINE
Filed May 27, 1950  6 Sheets-Sheet 6

INVENTORS
Edwin C. Brown
BY James D. Benbow
Brown, Jackson, Boettcher & Dienner
Attorneys United States Patent Office 2,748,509
Patented June 5, 1956

2,748,509
SIX WHEEL DRIVE AND STEER ROAD MACHINE

Edwin C. Brown and James D. Benbow, Aurora, Ill., assignors, by mesne assignments, to Baldwin-Lima-Hamilton Corporation, Philadelphia, Pa., a corporation of Pennsylvania Application May 27, 1950, Serial No. 164,636

9 Claims. (Cl. 37—156)

The present invention relates to self-propelled road machines or motor graders having six wheels through which the vehicle is propelled and steered. These six wheels comprise two front wheels and four real wheels, the four rear wheels being arranged in right and left tandem pairs at each side of the rear end of the vehicle frame. The scraper blade with which the motor grader is provided is mounted on the grader frame intermediate the front and rear wheels. The power plant for transmitting propelling energy to the six wheels is mounted on the rear portion of the vehicle frame.

One of the objects of the invention is to provide a self-propelled road machine or motor grader having the above described arrangement of six wheels, and wherein the location of four wheels under the rear end of the vehicle frame distributes the weight of the power plant more evenly, and also prevents side shifting of the road machine or motor grader during its operation in moving material or in leveling operations.

Another object of the invention is to provide a pair of steerable power driven front wheels and a set of four power driven steerable rear wheels mounted at the rear of the road machine or motor grader by means of a fifth wheel mounting, and having means to permit the steering of the front pair of wheels and of the rear set of four wheels all at one time, or the front pair of wheels and the rear set of wheels separately and in the same direction or in opposite directions, whereby to thus widen the traction base, and to permit either the front pair of wheels or the rear set of wheels to be placed in a ditch for moving the excess material toward the center of the road or toward the ditch.

The steering of the two front wheels is effected by the operation of a first hydraulic cylinder in response to the manipulation of a first control valve located at the operator's station, and the steering of the four rear wheels is effected by the operation of a second hydraulic cylinder, serving to swing the fifth wheel mounting of the rear wheels, in response to the manipulation of a second control valve also located at the operator's station. This facilitates steering the two sets of wheels together or at different angles.

The two front wheels have power driven steerable mounting at the ends of a transversely extending front axle. This front axle is pivotally connected at its center with the vehicle frame on a fore and aft central pivotal axis to permit relative transverse rocking movement to occur between the front axle and the frame. Power transmission means is provided for transmitting a power drive from the power plant to these front wheels.

The four tandem mounted rear wheels have power driven steerable mounting at the rear portion of the frame through a fifth wheel mounting comprising a stationary fifth wheel segment secured to the frame and a rotating fifth wheel segment having steerable rotative bearing engagement therewith. A main rear axle housing is carried by the rotative fifth wheel segment to rotate horizontally therewith, but is fixedly held against any vertical rocking movement relatively to the frame. Means is provided for transmitting a power drive from the power plant to the main rear axles in said main rear axle housing. Tandem axle housings have rocker beam mounting at the outer ends of the main rear axle housing on each side of the frame, and tandem rear axles are mounted at the front and rear ends of these tandem axle housings. The tandem pairs of rear wheels are mounted on these tandem rear axles at each side of the vehicle frame. Power transmission mechanisms are provided in each of these tandem axle housings for transmitting power from each of the main rear axles to its respective pair of tandem rear axles. The tandem axle housings have vertically rockable mounting at the ends of the main rear axle housing at points intermediate said tandem rear axles, so as to permit alternate rise and fall of the front and rear tandem wheels relatively to the vehicle frame in passing over uneven ground, while maintaining a rigidly supported unsprung relation between said frame and both tandem wheels for preventing simultaneous rise and fall of both tandem wheels relatively to the frame. This minimizes vertical movement of the scraper blade carried by the frame in passing over uneven ground, and maintains a more nearly level road in grading.

A further object or feature of the invention is the provision of an improved three-point mounting of the vehicle frame with respect to the front and rear wheels. These three mounting points comprise a front pivot point between the front end of the frame and the front axle, and two laterally spaced rear pivot points between the rear sides of the frame and the tandem rear wheels. The front pivot point consists of the central fore and aft pivotal connection between the front axle and the front end of the frame, which permits relative rocking movement between the front axle and the frame in the transverse plane of the front axle. The two laterally spaced rear pivot points consist of the rocker beam mountings of the tandem axle housings on the outer ends of the main rear axle housing, which rocker beam mountings permit relative longitudinal rocking movement between each pair of tandem rear wheels and each side of the frame in the longitudinal plane of the tandem rear wheels. These three points of support of the vehicle frame can rise and fall freely relatively to each other.

It will be apparent that the tandem wheel mounting of the four rear wheels substantially reduces the rise and fall of the scraper blade when the rear wheels pass over vertical obstructions or uneven ground. For example, when a vertical obstruction of say four inches in height passes under the front tandem wheel, the rocker action of the tandem axle housing will allow the front tandem wheel to go up four inches, but will only raise the central pivotal point of the tandem axle housing two inches. The same halving of the lift will occur when the obstruction passes under the rear tandem wheel.

A further object of the invention is to provide a self-propelled road machine of the above general description provided with a double reduction rear axle for the four tandem mounted rear wheels.

The invention further resides in the combination, construction and arrangement of parts illustrated in the accompanying drawings, and, while we have shown therein a preferred embodiment, it is to be understood that the same is susceptible of modification and change without departing from the spirit of our invention.

In the drawings:

Figure 1 is a side elevation of the motor grader, illustrating the rocking action of the tandem rear wheels in dotted lines;

Figure 2 is a plan view of Figure 1 with the cab and power plant removed, the full line positions of the wheels showing the positions they occupy when the grader is going straight ahead, and the dotted line positions of the front wheels and of the rear wheels indicating the positions of the wheels when rounding a curve;

Figure 3 is a cross-sectional view of Figure 2 taken on the plane of the line 3—3 of Figure 2;

Figure 4 is a fragmentary view taken on the plane of the line 4—4 of Figure 2, showing in elevation the right front wheel and steering cylinder;

Figures 4A and 4B are horizontal and vertical sectional views showing the fore and aft pivotal connection between the front axle and the front end of the frame;

Figure 5 is a plan view of Figure 2, showing the positions of the front and rear sets of wheels when going straight ahead;

Figure 6 is a plan view of Figure 2, showing the positions of the front and rear sets of wheels when the right hand front wheel is in the ditch or at the side of the road, and the rear set of wheels is near the center of the road;

Figure 7 is a plan view of Figure 2, showing the positions of the front pair of wheels and the rear set of wheels when the right hand tandem pair of rear wheels is in the ditch or at the side of the road, and the front pair of wheels is near the center of the road;

Figure 8:
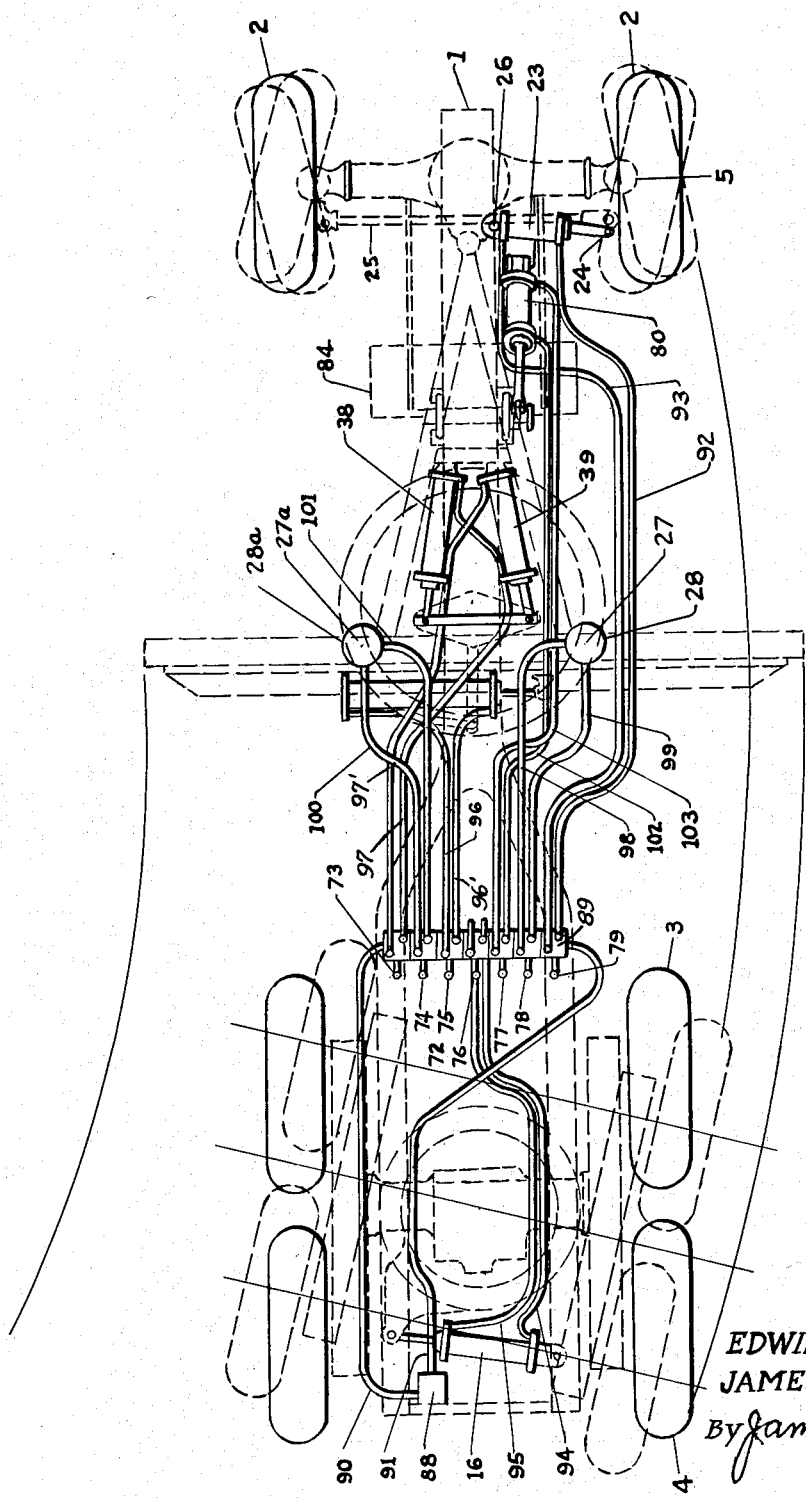
Figure 8 is a schematic layout of the hydraulic control system.

The self-propelled road machine or road grader of our invention comprises a main frame of any suitable construction, designated 1 in its entirety, this frame being supported on the front power driven steerable wheels 2 and on the rear power driven steerable wheels 3 and 4.

The front power driven steerable wheels 2 are mounted on the conventional type of steering and driving axle 5. The front part of the frame 1 is in the form of a single center frame channel or beam which arches upwardly over the scraper blade, and then inclines downwardly and forwardly over the differential or drive gear housing 35 located centrally in the front axle assembly (see Figure 2). This conventional type of front steering and driving axle 5 has central pivotal connection with the frame 1 at the differential housing 35, as shown in dotted lines in Figure 1, whereby relative transverse rocking or tilting movement can occur between the front axle 5 and the front end of the frame 1. The gear housing 35 carries aligned front and rear pivot pins 35' and 35" which engage respectively in a downward front extension 1b of the frame 1, and in a bearing plate 1c, which is secured to the frame. Such conventional type of front steering and driving axle 5 having transversely rockable mounting on the main frame 1 is shown in detail in Wilson and Burns Patent 2,195,607, issued April 2, 1940.

The tandem pairs of rear power driven wheels 3 and 4 are mounted on stub axles 6, which in turn rotate on roller bearings mounted in the tandem housings 7. The tandem stub axles 6 are adapted to be driven from main rear drive axles 8 enclosed within a main rear axle housing 9. The tandem housings 7 are pivotally mounted on the ends of the rear axles 8 or on the ends of the rear axle housing 9 for vertical oscillating movement about the axis of the rear drive axles 8, so that at each side of the vehicle the front tandem wheel 3 and the rear tandem wheel 4 can rise and fall relatively to each other, as illustrated by the full line and the dotted line positions of the rear tandem wheels, shown in Figure 1. While these aligned tandem wheels 3 and 4 can have this vertical rising and falling movement relatively to each other around the axis of the rear drive axles 8, both tandem wheels cannot rise and fall together relatively to the rear drive axles 8 and main frame 1. Otherwise stated, said tandem axle housings 7 have vertically rockable mounting at the ends of the main rear axle housing 9 at points intermediate the tandem rear axles 6 so as to permit alternate rise and fall of the front and rear tandem wheels 3 and 4 relatively to the frame 1, while maintaining a positively supported unsprung relation between the tandem wheels and the frame for preventing simultaneous rise and fall of both tandem wheels relatively to the frame. Hence, while these rear tandem wheels 3 and 4 can have relative rising and falling movement to accommodate travel over rough and uneven ground, and also to accommodate different operating conditions in the performance of different grading operations, nevertheless the vehicle frame and scraper blade cannot thereby have free rising and falling movement relatively to the ground. More specifically, the vehicle is "unsprung," since it does not employ any leaf spring mounting to permit this relative vertical movement between the tandem rear wheels 3 and 4, but obtains it by the vertical pivotal rocking of the tandem axle housings 7 around the axis of the main rear axle housing 9. Similarly, the front end of the frame is also "unsprung" with respect to the front wheels 2 and front axle 5, but the pivotal connection between the front axle and the frame affords a third point of support for the frame which permits relative transverse rocking movement between the front axle and the frame. A spring mounting of the frame with respect to either the back wheels or the front wheels is usually detrimental in a road scraper, because of the difficulty it introduces to blading a roadway in a smooth plane.

Referring to the three point mounting of the frame, the front pivot point is represented by the aligned pivot pins 35' and 35" which permit relative rocking movement between the front axle 5 and the frame 1 in the transverse plane of the front axle 5. The two rearwardly disposed pivot points of the frame consist of the rocker beam pivotal mountings of the tandem axle housings 7 on the outer ends of the main rear axle housing 9, which rocker beam pivotal mountings permit relative longitudinal rocking movement between each pair of tandem rear wheels 3 and 4 and each side of the frame in the longitudinal planes of the tandem rear wheels 3 and 4. These three points of support of the vehicle frame can rise and fall freely relatively to each other.

Referring more specifically to the manner of driving the tandem pairs of rear wheels 3 and 4, it will be seen from Figures 1–3 that the rear axle housing 9 comprises substantially at its center an enlarged gear housing 9a in which is enclosed a set of double reduction speed reducing gearing 9b. This speed reducing gearing comprises in its first step of speed reduction a bevel pinion 9c which is adapted to be driven from the power plant of the vehicle through a propeller shaft 22, which will be later described. The bevel pinion 9c drives a relatively large bevel gear 9d which is rotatably mounted upon a counter shaft axis 9e spaced from the axis of the main gear drive axles 8. The second stage of the double reduction gearing comprises a driving spur pinion 9f which is secured to the large bevel gear 9d, and has driving mesh with a relatively large spur gear 9g, which is concentric with the main rear drive axles 8. This large spur gear 9g is connected in any suitable driving relation to the inner ends of these rear drive axles 8 to transmit the double reduction drive to these axles, there preferably being no differential gearing between these rear drive axles 8.

At each side of the vehicle, the tandem rear axles 6 and the associate pair of tandem rear wheels 3 and 4 are driven from the corresponding main rear axle 8 by means of sprockets 10, 11 and 12 and by chain drives 13. A set of gears mounted on stub axles 6 and main axle 8 may be substituted instead of the sprockets and chains.

The rear axle housing 9 has a rotative fifth wheel segment 14 mounted on the upper side thereof which is rotatively confined within an upper stationary fifth wheel segment 14a that is bolted or otherwise rigidly secured to the underside of the grader frame 1.

Connected by bolts 17 to the underside of the grader frame is a hydraulic cylinder 16, from the end of which extends a piston rod 16a which is connected by pivot 15 to the rotative fifth wheel segment 14. By controls which will be later explained, the rear set of four wheels can be steered to a point straight ahead or to either right or left as desired.

On the rear of the main frame 1 is mounted an internal combustion engine or power plant 18 having a conventional type of transmission 19 and gear shift. At the front of the conventional type of transmission 19 is mounted the power takeoff 20. Extending forwardly and rearwardly of the power takeoff are power transmission propeller shafts 21 and 22 which are connected to and drive the front axles 5' and the rear driving axles 8, respectively. As shown in Figures 1, 2 and 3, the rear propeller shaft 22 has articulated joint connections therein including front and rear universal joints 22a and 22b, together with an intermediate telescopic shaft connection 22c, 22d between the universal joints. These articulated joint connections permit the required degree of lateral swinging movement of the propeller shaft 22 to accommodate the rotative steering movement of the rear axle housing 9, together with its double reduction gear housing 9a around the vertical axis of the fifth wheel mounting 14, 14a.

The front power driven steerable wheels 2, having conventional steering knuckle mounting 5a at the outer ends of the front axle 5 (Figure 2), are steered by the hydraulic cylinder 23 which has its piston rod connected at 24 to transverse connecting rod 25, the hydraulic cylinder being pivotally connected to the front axle housing 35 at pivot point 26. The method of steering will be described later. Contained within the drive gear housing 35 of the front axle assembly 5 is a set of double reduction, speed reducing gearing which has the same ratio as the double reduction, speed reducing gearing 9b contained within the rear axle housing 9, whereby the front wheels 2 and the rear wheels 3 and 4 all rotate at the same speed. The large bevel gear in the front drive gear housing 35 is positioned on the proper side of the bevel pinion to cause the front wheels 2 to rotate in the same direction as the rear wheels 3 and 4.

Suspended on either side of the main frame 1 by cross members 1a are hydraulic cylinders 27 and 27a which have universal mounting in ball and socket joints 28 and 28a. Piston rods 29 and 29a of the hydraulic cylinders 27 and 27a are attached by ball and socket joints 30 and 31 to the gooseneck or blade supporting frame 32 through the cross beam or angle 33. The front end of the gooseneck or blade supporting frame 32 has a ball and socket joint 34 which is attached to the front axle housing 35.

Supporting and guiding the circle 36 are brackets 37 which are riveted or bolted to gooseneck or blade supporting frame 32. Circle 36 is rotated by two double acting hydraulic cylinders 38 and 39. The forward ends of the cylinders 38 and 39 are connected to gooseneck or blade supporting frame 32 by pins or bolts 40, and the piston rods 41 and 42 are connected to a crank or lever 43 by pins or bolts 44.

Welded to the crank or lever 43 is pin 45 which rotates in bearings of the cross members 33. The crank or lever 43 also has an extension arm 46 welded thereto, which extension arm is connected to motion transmitting linkage 47 by pins or bolts, and linkage 47 is connected in turn to the circle 36 by pins or bolts.

Attached to the circle 36 by welding or riveting are blade supporting members 48 and 49. At the lower ends of blade supporting members 48 and 49 is welded a tube 50. The blade and bit 51 have lugs 52 through which the rod 53 is attached and is supported and slides in tube 50. The upper end of blade and bit 51 have lugs 54 to which rod 55 is attached and rod 55 is supported and slides in tube 56. For further details of the blade supporting mechanism attention is directed to the Wilson and Burns Patent 2,195,607.

For side shifting the blade and bit 51 on its blade supporting members 48 and 49, a double acting hydraulic cylinder 63 is attached to blade supporting member 48 by cylinder head 64 which has a convex surface to permit lateral oscillation. Piston rod 65 is connected to the blade by ball and socket joint 66.

By the above mentioned construction of the blade and bit and circle, together with the hydraulic cylinder mounted on the blade and bit, it is possible for the operator to side shift and blade and bit on its supporting means during the forward or backward movement of the grading machine without leaving the operator's station 72.

The raising or lowering of the blade and bit is accomplished by the operation of the hydraulic cylinders 27 and 27a mounted one on each side of the main frame 1.

To side shift the gooseneck or blade supporting frame 32, circle 36, and blade and bit 51, a hydraulic cylinder 67 can be connected to bracket 68 which is a part of the main frame 1, by a ball and socket joint 69, and the piston rod 70 connected to the cross beam or angle 33 by a ball socket joint 71, which hydraulic cylinder 67 can be controlled from the operator's platform 72 by the use of a valve.

A scarifier 84 may be attached to the front end of the main frame 1 at any convenient location 88 by curved arms 82 and lifting links 83 connected to crank 86. This crank is rotated by cylinder 80 connected to the main frame 1 at a convenient location 87 and having its piston rod 81 connected to the crank 86 for raising and lowering the scarifier when needed.

In Figure 2, the solid lines show the positions of wheels 2, 3 and 4 when driving the grader forward or backward in a straight line, and the dotted lines show the positions of the wheels 2, 3 and 4 when grader is rounding a curve.

Figure 5 is an outline drawing of the wheels, frame and blade when the grader is being propelled forwardly in a straight line, and the blade is removing material from the right side of the road and delivering it toward the center of the road.

Figure 6 is an outline drawing showing the position of the wheels, grader frame and blade when the grader frame is set at an angle to the direction of travel, and the blade is removing material from a ditch or the outside edge of the road and delivering it to the center of the road or approximately.

Figure 7 is an outline drawing showing the position of the wheels, grader frame and blade when the grader frame is set at an angle opposite to Figure 6 and the rear wheels are in the ditch or at the outside edge of the road, and the front wheels are near the center of the road with the blade removing material from the ditch or outside edge of the road and delivering it toward the center of the road.

Figure 9:
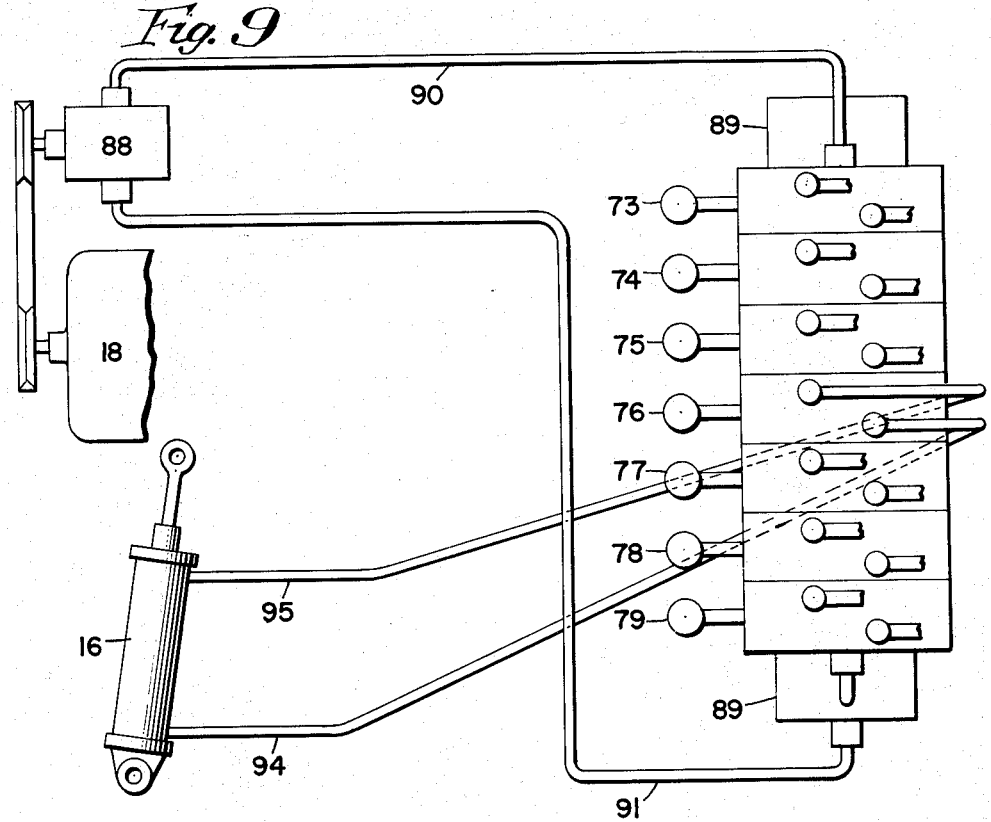
Figures 9 and 10 are explanatory diagrams of the hydraulic control system.
Figure 10:
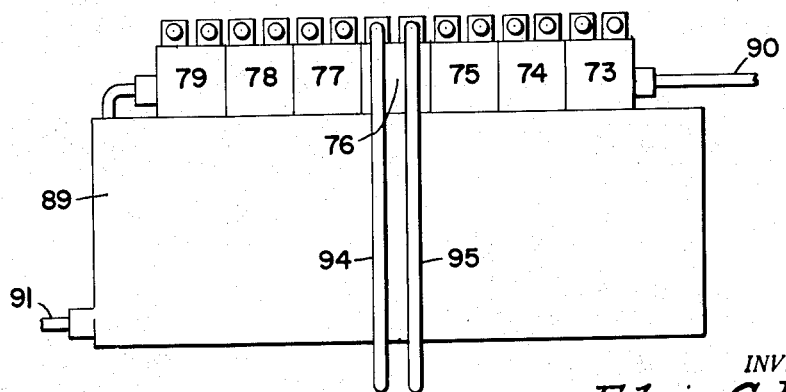

Figures 8, 9 and 10 are schematic layouts of the hydraulic control system of Figures 1 and 2, which is substantially the same as the hydraulic control system disclosed in Wilson and Burns Patent 2,195,607, issued April 2, 1940.

Referring thereto, it will be seen, that an oil tank 89 is mounted in the front of the operator's station 72 and is connected to pump 88 by suction pipe line 91. Power plant 18 supplies power to operate pump 88.

The control valves 73, 74, 75, 76, 77, 78 and 79 are located on top of the oil tank 89 at the operator's station 72 in front of the operator. Pressure line 90 supplies oil under pressure from pump 88 to the control valves 73–79, and these control valves return the oil to oil tank 89.

To steer the front pair of power driven steerable wheels 2, valve 79 is moved forward or backward from neutral position, admitting oil under pressure from pressure line 90 to valve 79 and then to either end of the cylinder 23 through pipe lines 92 or 93, depending on the direction of the movement desired. Likewise the rear four power driven steerable wheels 3 and 4 can be controlled by valve 76 and cylinder 16 through pipe lines 94 and 95.

The side shifting of the blade and bit 51 on its supporting means 48 and 49 is controlled by valve 75 which admits oil by pipe lines or hose 96 or 96' to either side of piston of cylinder 63 by moving the handle of valve 75 forward or backward, depending on the direction that blade and bit 51 is to be shifted.

The rotating of the circle 36, blade supporting means 48 and 49 and blade and bit 51 is controlled by valve 73 which admits oil by pipe lines 97 and 97' to the opposite ends of cylinders 38 and 39, causing the cylinders 38 and 39 to operate in unison in rotating the circle 36 in the direction desired by the movement of the valve 73 forward or backward, depending on the direction required.

The raising and lowering of the gooseneck or blade supporting frame 32, circle 36, and blade and bit 51 is accomplished by hydraulic cylinders 27 and 27a, which are supported by ball and socket joints 28 and 28a to permit oscillation on cross members 1a, and the piston rods 29 and 29a are connected to the gooseneck or blade supporting frame 32. Control valve 74 admits oil by pipe lines 100 and 101 to the upper or lower side of the cylinder piston 27a and moving the handle of valve 74 forward or backward will raise or lower the left hand side of the blade and its supporting means.

Likewise, cylinder 27 is controlled by valve 78 which admits oil by pipe lines 98 and 99 to the upper and lower sides of the piston of cylinder 27.

Both right and left sides of the blade and bit 51 can be raised together, or one side can be lowered and the other raised or vice versa, all being under the control of the operator located at the operator's station 72.

When it is desired to raise and lower scarifier 84, this is accomplished through hydraulic cylinder 80 by the use of control valve 77 which admits oil to either side of the piston of cylinder 80 through pipe lines 102 and 103 so that by moving valve 79 forward or backward, the scarifier 84 will be raised or lowered as desired.

As all the hydraulic control means or valves are located within easy reach of and in front of the operator in the operator's station 72 and the operator has full control of all the necessary movements of the blade and its supporting means, it will be seen that the operator can effect the steering of the front pair of power driven steerable wheels and the steering of the set of four rear power driven steerable wheels while the machine is in operation, thus eliminating the necessity of the operator stopping the road machine or grader and leaving the station to perform any of the above mentioned adjustments or movements. In this same manner, the operator can also increase the traction base and prevent the side slippage of the machine or road grader during its operation.

Any other conventional and well known hydraulic system, or mechanical apparatus, may be employed for imparting steering motion to the front and rear wheels 2, 3 and 4; also for adjusting the scraper blade 51, and for raising and lowering the scarifier 88, etc.

While we have illustrated and described what we regard to be the preferred embodiment of our invention, nevertheless it will be understood that such is merely exemplary and that numerous modifications and rearrangements may be made therein without departing from the essence of the invention.

We claim:

1. In a self-propelled road grader of the class described, the combination of a vehicle frame, a single power plant on said frame, a front axle pivotally connected with said frame to permit relative transverse rocking movement between said front axle and frame, a pair of steerable, power-driven front wheels having steering knuckle mounting at the outer ends of said front axle, means for transmitting a power drive from said single power plant to said front wheels, hydraulic means for steering said front wheels, said vehicle frame having an upwardly arched intermediate portion, a scraper blade carried below said upwardly arched intermediate portion, a fifth wheel mounting under the rear portion of said frame comprising a stationary fifth wheel segment secured to said frame and a rotative fifth wheel segment having rotative bearing engagement therewith, a main rear axle housing carried by said rotative fifth wheel segment to rotate horizontally therewith but fixedly held against any vertical rocking movement relatively to said frame, main rear axles in said main rear axle housing, said rear axle housing comprising a gear housing substantially at its center, double reduction gearing in said gear housing comprising a relatively large spur gear connected with said main rear axles, a spur pinion on a countershaft axis in said gear housing and meshing with said large spur gear, a bevel gear on said countershaft axis connected with said spur pinion, a bevel pinion in said gear housing meshing with said bevel gear, a propeller shaft connected with said bevel pinion and extending forwardly from said gear housing in a generally horizontal direction, means for transmitting power from said same single power plant to the front end of said propeller shaft, said propeller shaft comprising articulated drive connections including universal joints permitting steering movement of said rear axle housing and gear housing in said fifth wheel mounting, tandem axle housings mounted at the outer ends of said main rear axle housing on each side of said frame, tandem rear axles mounted at the front and rear ends of said tandem axle housings, tandem pairs of rear wheels mounted on said tandem rear axles at each side of said frame, chain drive transmission mechanisms in each of said tandem housings for transmitting power from each of said main rear axles to its respective pair of tandem rear axles, said tandem axle housings having vertically rockable mounting at the ends of said main axle housing at points intermediate said tandem rear axles so as to permit alternate rise and fall of the front and rear tandem wheels relatively to said frame, while maintaining a positively supported unsprung relation between said tandem wheels and said frame for preventing simultaneous rise and fall of both tandem wheels relatively to said frame, so as to practically eliminate vertical movement of said scraper blade in passing over a vertical obstruction, thereby maintaining a more nearly level road in grading, and hydraulic mechanism operatively connected between said vehicle frame and said rotative fifth wheel segment for swiveling said rear axle housing, gear housing, tandem axle housings and tandem rear wheels to right or left as a unit relatively to said vehicle frame.

2. In a motor grader, the combination of a vehicle frame, a power plant on said frame, a front axle for supporting the front end of said frame, said front axle being pivotally connected in an unsprung relation with said frame to permit relative transverse rocking movement to occur between said front axle and frame, a pair of steerable power driven front wheels having steering knuckle mounting at the outer ends of said front axle, means for transmitting a power drive from said power plant to said front wheels, hydraulic steering means for steering said front wheels, a scraper blade carried by an intermediate portion of said frame, a fifth wheel mounting under the rear portion of said frame comprising a stationary fifth wheel segment secured to said frame and a rotative fifth wheel segment having rotative bearing engagement therewith, a main rear axle housing carried by said rotative fifth wheel segment to rotate horizontally therewith but fixedly held against any vertical rocking movement relatively to said frame, main rear axles in said rear axle housing, said rear axle housing comprising a gear housing substantially at its center, reduction gearing in said gear housing comprising a bevel gear connected with said main rear axles, a bevel pinion in said gear housing meshing with said bevel gear, a propeller shaft connected with said bevel pinion and extending forwardly from said gear housing in a generally horizontal direction, means for transmitting power from said power plant to the front end of said propeller shaft, said propeller shaft comprising articulated drive connections including universal joints permitting steering movement of said rear axle housing and gear housing in said fifth wheel mounting, tandem axle housings mounted at the outer ends of said main rear axle housing on each side of said frame, tandem rear axles mounted at the front and rear ends of said tandem axle housings, tandem pairs of rear wheels mounted on said tandem rear axles at each side of said frame, power transmission mechanisms in each of said tandem axle housings for transmitting power from each of said main rear axles to its respective pair of tandem rear axles, said tandem axle housings having vertically rockable mounting at the ends of said main axle housing at points intermediate said tandem rear axles so as to permit alternate rise and fall of the front and rear tandem wheels relatively to said frame, while maintaining a positively supported unsprung relation between said tandem wheels and said frame for preventing simultaneous rise and fall of both tandem wheels relatively to said frame, so as to minimize vertical movement of said scraper blade in passing over uneven ground, thereby maintaining a more nearly level road in grading, and hydraulic mechanism operatively connected between said vehicle frame and said rotative fifth wheel segment for swiveling said rear axle housing, gear housing, tandem axle housings and tandem rear wheels to right or left as a unit relatively to said vehicle frame.

3. In a motor grader, the combination of a vehicle frame, a power plant on said frame, a pair of steerable power-driven front wheels supporting the front end of said frame, means for transmitting a power drive from said power plant to said front wheels, hydraulic steering means for steering said front wheels, a scraper blade carried by an intermediate portion of said frame, a fifth wheel mounting under the rear portion of said frame comprising a stationary fifth wheel segment secured to said frame and a rotative fifth wheel segment having rotative bearing engagement therewith, a main rear axle housing carried by said rotative fifth wheel segment to rotate horizontally therewith, main rear axles in said main rear axle housing, said rear axle housing comprising a gear housing substantially at its center, double reduction gearing in said gear housing comprising a relatively large spur gear connected with said main rear axles, a spur pinion on a countershaft axis in said gear housing and meshing with said large spur gear, a bevel gear on said countershaft axis connected with said spur pinion, a bevel pinion in said gear housing meshing with said bevel gear, a propeller shaft connected with said bevel pinion and extending forwardly from said gear housing in a generally horizontal direction, means for transmitting power from said same single power plant to the front end of said propeller shaft, said propeller shaft comprising articulated drive connections including universal joints permitting steering movement of said rear axle housing and gear housing in said fifth wheel mounting, tandem axle housings mounted at the outer ends of said main rear axle housing on each side of said frame, tandem rear axles mounted at the front and rear ends of said tandem axle housings, tandem pairs of rear wheels mounted on said tandem rear axles at each side of said frame, chain drive transmission mechanisms in each of said tandem housings for transmitting power from each of said main rear axles to its respective pair of tandem rear axles, said tandem axle housings having vertically rockable mounting at the ends of said main axle housing at points intermediate said tandem rear axles so as to permit alternate rise and fall of the front and rear tandem wheels relatively to said frame, while maintaining a positively supported unsprung relation between said tandem wheels and said frame for preventing simultaneous rise and fall of both tandem wheels relatively to said frame, whereby said scraper blade is positively held in a substantially true rigid plane in grading, and hydraulic mechanism operatively connected between said vehicle frame and said rotative fifth wheel segment for swiveling said rear axle housing, gear housing, tandem axle housings and tandem rear wheels to right or left as a unit relatively to said vehicle frame.

4. In a motor grader having a scraper blade, the combination of a vehicle frame, a power plant on said frame, a pair of steerable power-driven front wheels supporting the front end of said frame, means for transmitting a power drive from said power plant to said front wheels, hydraulic steering means for steering said front wheels, a fifth wheel mounting under the rear portion of said frame comprising a stationary fifth wheel segment secured to said frame and a rotative fifth wheel segment having rotative bearing engagement therewith, a main rear axle housing carried by said rotative fifth wheel segment to rotate horizontally therewith, main rear axles in said rear axle housing, said rear axle housing comprising a gear housing substantially at its center, reduction gearing in said gear housing comprising a bevel gear connected with said main rear axles, a bevel pinion in said gear housing meshing with said bevel gear, a propeller shaft connected with said bevel pinion and extending forwardly from said gear housing in a generally horizontal direction, means for transmitting power from said power plant to the front end of said propeller shaft, said propeller shaft comprising articulated drive connections including universal joints permitting steering movement of said rear axle housing and gear housing in said fifth wheel mounting, tandem axle housings mounted at the outer ends of said main rear axle housing on each side of said frame, tandem rear axles mounted at the front and rear ends of said tandem axle housings, tandem pairs of rear wheels mounted on said tandem rear axles at each side of said frame, chain drive transmission mechanism in each of said tandem housings for transmitting power from each of said main rear axles to its respective pair of tandem rear axles, said tandem axle housings having vertically rockable mounting at the ends of said main axle housing at points intermediate said tandem rear axles so as to permit alternate rise and fall of the front and rear tandem wheels relatively to said frame, while maintaining a positively supported unsprung relation between said tandem wheels and said frame for preventing simultaneous rise and fall of both tandem wheels relatively to said frame, so as to minimize vertical movement of said scraper blade in passing over uneven ground, thereby maintaining a more nearly level road in grading, and hydraulic mechanism operatively connected between said vehicle frame and said rotative fifth wheel segment for swiveling said rear axle housing, gear housing, tandem axle housings and tandem rear wheels to right or left as a unit relatively to said vehicle frame.

5. In a motor grader, the combination of a vehicle frame, a power plant on said frame, a front axle pivotally connected in an unsprung relation with said frame to permit relative transverse rocking movement between said front axle and frame, a pair of steerable power driven front wheels having steering knuckle mounting at the outer ends of said front axle, means for transmitting a power drive from said power plant to said front wheels, a scraper blade carried by an intermediate portion of said frame, a steerable fifth wheel mounting under the rear portion of said frame comprising a stationary fifth wheel segment secured to said frame and a rotative fifth wheel segment having steerable rotative bearing engagement therewith, a main rear axle housing carried by said rotative fifth wheel segment to rotate substantially horizontally therewith but fixedly held against any vertical rocking movement relatively to said frame, main rear axles in said rear axle housing, means for transmitting a power drive from said power plant to said main rear axles including a bevel gear set in said rear axle housing connected with said main rear axles and a substantially horizontal propeller shaft connecting with said bevel gear set, tandem axle housings having rocker beam mounting at the outer ends of said main rear axle housing on each side of said frame, tandem rear axles mounted at the front and rear ends of said tandem axle housings, tandem pairs of rear wheels mounted on said tandem rear axles at each side of said frame, and power transmission mechanisms in each of said tandem axle housings for transmitting power from each of said main rear axles to its respective pair of tandem rear axles, said tandem axle housings having vertically rockable mounting at the ends of said main rear axle housing at points intermediate said tandem rear axles so as to permit alternate rise and fall of the front and rear tandem wheels relatively to said frame in passing over uneven ground, while maintaining a rigidly supported unsprung relation between said frame and both tandem wheels for preventing simultaneous rise and fall of both tandem wheels relatively to said frame.

6. In a motor grader, the combination of a vehicle frame, a power plant on said frame, a front axle pivotally connected in an unsprung relation with said frame to permit relative transverse rocking movement between said front axle and frame, a pair of steerable power driven front wheels having steering knuckle mounting at the outer ends of said front axle, means for transmitting a power drive from said power plant to said front wheels, a steerable fifth wheel mounting under the rear portion of said frame comprising a stationary fifth wheel segment secured to said frame and a rotative fifth wheel segment having steerable rotative bearing engagement therewith, a main rear axle housing carried by said rotative fifth wheel segment to rotate substantially horizontally therewith but fixedly held against any vertical rocking movement relatively to said frame, main rear axles in said rear axle housing, means for transmitting a power drive from said power plant to said main rear axles, tandem axle housings having rocker beam mounting at the outer ends of said main rear axle housing on each side of said frame, tandem rear axles mounted at the front and rear ends of said tandem axle housings, tandem pairs of rear wheels mounted on said tandem rear axles at each side of said frame, and power transmission mechanisms in each of said tandem axle housings for transmitting power from each of said main rear axles to its respective pair of tandem rear axles, said tandem axle housings having vertically rockable mounting at the ends of said main rear axle housing at points intermediate said tandem rear axles so as to permit alternate rise and fall of the front and rear tandem wheels relatively to said frame in passing over uneven ground, while maintaining a rigidly supported unsprung relation between said frame and both tandem wheels for preventing simultaneous rise and fall of both tandem wheels relatively to said frame.

7. In a motor grader, the combination of a vehicle frame, a power plant on said frame, a front axle for supporting the front end of said frame, a pair of steerable power driven front wheels mounted at the outer ends of said front axle, means for transmitting a power drive from said power plant to said front wheels, a steerable fifth wheel mounting under the rear portion of said frame comprising a stationary fifth wheel segment secured to said frame and a rotative fifth wheel segment having steerable rotative bearing engagement therewith, a main rear axle housing carried by said rotative fifth wheel segment to rotate horizontally therewith but fixedly held against any vertical rocking movement relatively to said frame, main rear axles in said rear axle housing, means for transmitting a power drive from said power plant to said main rear axles, tandem axle housings having rocker beam mounting at the outer ends of said main rear axle housing on each side of said frame, tandem rear axles mounted at the front and rear ends of said tandem axle housings, tandem pairs of rear wheels mounted on said tandem rear axles at each side of said frame, and power transmission mechanisms in each of said tandem axle housings for transmitting power from each of said main rear axles to its respective pair of tandem rear axles, said tandem axle housings having vertically rockable mounting at the ends of said main rear axle housing at points intermediate said tandem rear axles so as to permit alternate rise and fall of the front and rear tandem wheels relatively to said frame in passing over uneven ground, while maintaining a rigidly supported unsprung relation between said frame and both tandem wheels for preventing simultaneous rise and fall of both tandem wheels relatively to said frame.

8. In a self-propelled vehicle, the combination of a vehicle frame, a power plant on said frame, a front axle for supporting the front end of said frame, said front axle being pivotally connected in an unsprung relation with said frame to permit relative transverse rocking movement to occur between said front axle and frame, a pair of steerable power driven front wheels having steering knuckle mounting at the outer ends of said front axle, means for transmitting a power drive from said power plant to said front wheels, steering means for steering said front wheels, a fifth wheel mounting under the rear portion of said frame comprising a stationary fifth wheel segment secured to said frame and a rotative fifth wheel segment having rotative bearing engagement therewith, a main rear axle housing carried by said rotative fifth wheel segment to rotate horizontally therewith but fixedly held against any vertical rocking movement relatively to said frame, main rear axles in said rear axle housing, said rear axle housing comprising a gear housing substantially at its center, reduction gearing in said gear housing comprising a bevel gear connected with said main rear axles, a bevel pinion in said gear housing meshing with said bevel gear, a propeller shaft having one end connected with said bevel pinion and having its other end extending from said gear housing in a generally horizontal direction, means for transmitting power from said power plant to said other end of said propeller shaft, tandem axle housings mounted at the outer ends of said main rear axle housing on each side of said frame, tandem rear axles mounted at the front and rear ends of said tandem axle housings, tandem pairs of rear wheels mounted on said tandem rear axles at each side of said frame, power transmission mechanisms in each of said tandem axle housings for transmitting power from each of said main rear axles to its respective pair of tandem rear axles, said tandem axle housings having vertically rockable mounting at the ends of said main rear axle housing at points intermediate said tandem rear axles so as to permit alternate rise and fall of the front and rear tandem wheels relatively to said frame, while maintaining a positively supported unsprung relation between said tandem wheels and said frame for preventing simultaneous rise and fall of both tandem wheels relatively to said frame, and steering mechanism operatively connected between said rotative fifth wheel segment and said frame for swiveling said tandem rear wheels to right or left relatively to said vehicle frame.

9. In a self-propelled vehicle, the combination of a vehicle frame, a power plant on said frame, a front axle pivotally connected in an unsprung relation with said frame to permit relative transverse rocking movement between said front axle and frame, a pair of steerable power-driven front wheels mounted at the outer ends of said front axle, means for transmitting a power drive from said power plant to said front wheels, a steerable fifth wheel mounting under the rear portion of said frame comprising a stationary fifth wheel segment secured to said frame and a rotative fifth wheel segment having steerable rotative bearing engagement therewith, a main rear axle housing carried by said rotative fifth wheel segment to rotate substantially horizontally therewith but fixedly held against any vertical rocking movement relatively to said frame, main rear axles in said rear axle housing, means for transmitting a power drive from said power plant to said main rear axles including a bevel gear set in said rear axle housing connected with said main rear axles and a substantially horizontal propeller shaft connecting with said bevel gear set, tandem axle housings having rocker beam mounting at the outer ends of said main rear axle housing on each side of said frame, tandem rear axles mounted at the front and rear ends of said tandem axle housings, tandem pairs of rear wheels mounted on said tandem rear axles at each side of said frame, and power transmission mechanisms in each of said tandem axle housings for transmitting power from each of said main rear axles to its respective pair of tandem rear axles, said tandem axle housings having vertically rockable mounting at the ends of said main rear axle housing at points intermediate said tandem rear axles so as to permit alternate rise and fall of the front and rear tandem wheels relatively to said frame in passing over uneven ground, while maintaining a rigidly supported unsprung relation between said frame and both tandem wheels for preventing simultaneous rise and fall of both tandem wheels relatively to said frame.

References Cited in the file of this patent

UNITED STATES PATENTS

| | | |
|---|---|---|
| 1,004,907 | Rodin | Oct. 1, 1911 |
| 1,022,151 | Palmer | Apr. 2, 1912 |
| 1,983,826 | Wilson | Dec. 11, 1934 |
| 2,195,607 | Wilson et al. | Apr. 12, 1940 |
| 2,280,741 | Bolster et al. | Apr. 21, 1942 |
| 2,287,438 | Lindsay | June 23, 1942 |
| 2,374,196 | Harbers | Apr. 24, 1945 |

FOREIGN PATENTS

| | | |
|---|---|---|
| 537,619 | Great Britain | June 30, 1941 |